Patented May 29, 1945

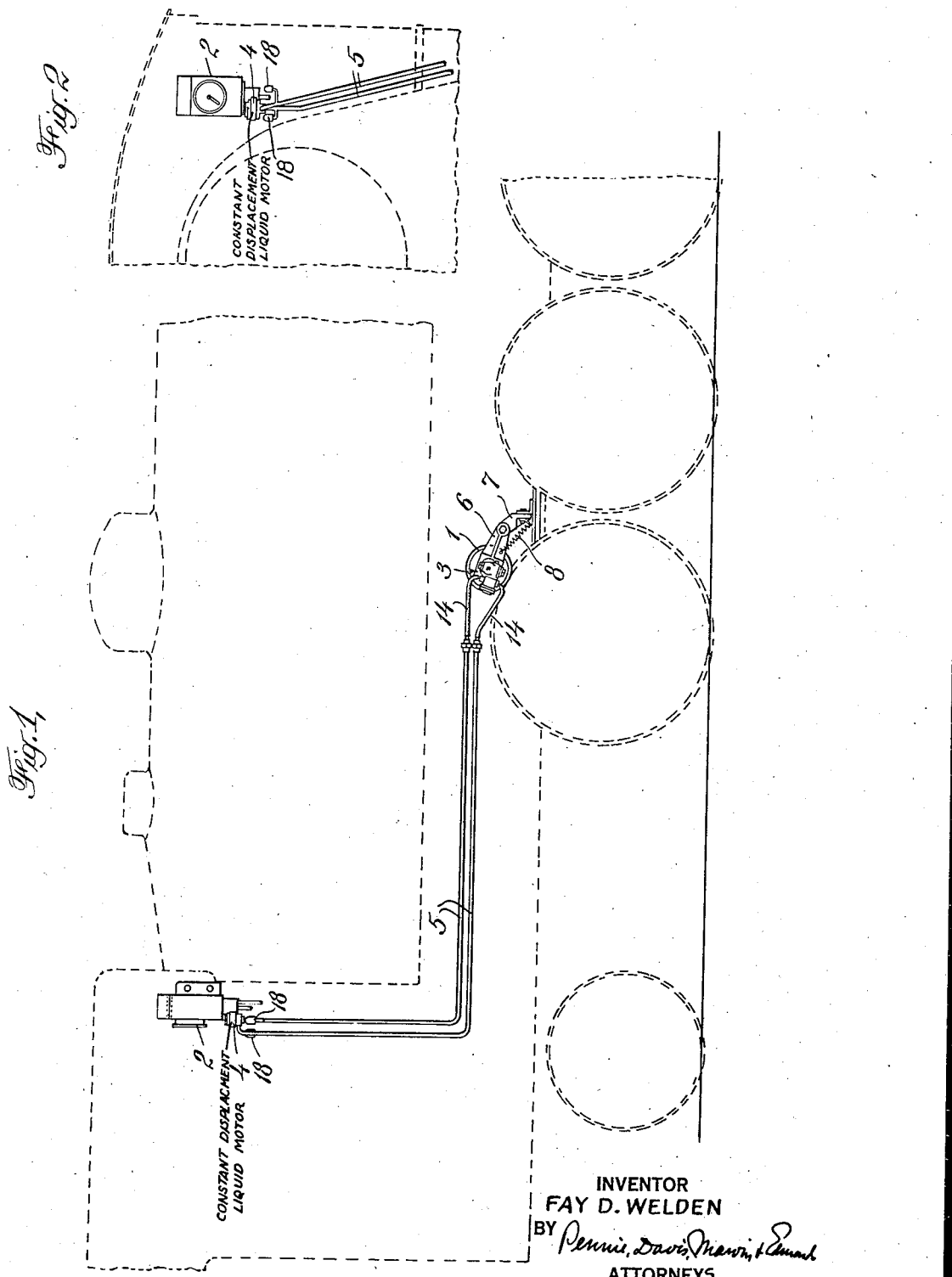

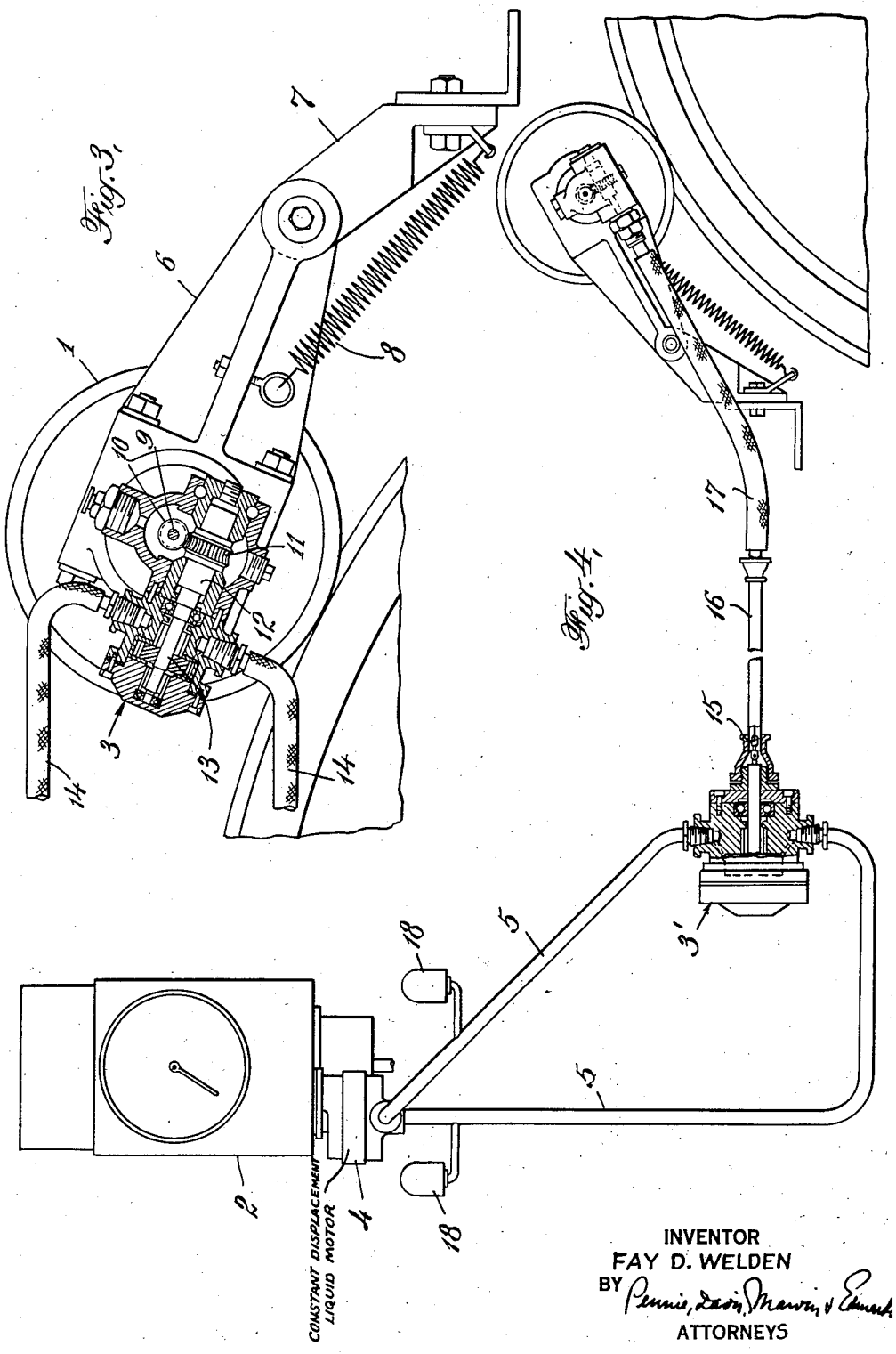

2,377,284

UNITED STATES PATENT OFFICE 2,377,284

DRIVING MECHANISM FOR SPEED INDICATORS

Fay D. Welden, Tuckahoe, N. Y., assignor to Valve Pilot Corporation, New York, N. Y., a corporation of New York Application December 5, 1941, Serial No. 421,762

1 Claim. (Cl. 264—14)

This invention relates to driving mechanism for speed indicators, particularly those used on steam locomotives. The driving mechanism in common use today for operating the speed indicator of a steam locomotive comprises a friction drive wheel pivotally mounted on a bracket adjacent one of the drivers and making driving contact with its tread, and a flexible shaft rotated by the drive wheel and extending, through a conduit, to the instrument in the cab. A driving mechanism of this type is illustrated in Wallbillich Patent No. 1,634,565, July 5, 1927.

The use of a long flexible shaft in such a drive is objectionable. The conduit that houses the shaft is commonly made of seamless steel tubing, three-quarters of an inch inside diameter and one and one-sixteenth inches outside diameter. It cannot be bent on a curvature of less than a thirty-inch radius without subjecting the shaft to excessive wear and increasing the power required to operate the mechanism. This necessarily wide sweep makes installation difficult, particularly on a steam locomotive.

It is the object of the present invention to overcome this difficulty, and this I have done by eliminating the flexible shaft and its refractory conduit (except, perhaps, for a short length adjacent the friction drive) and using instead a hydraulic pump near the drive wheel coupled to a constant displacement liquid motor at the instrument. The pump, driven by the friction wheel at a speed proportional to the speed of the locomotive, circulates oil or other liquid through hydraulic tubing connecting the pump to the motor and thus drives the motor at a proportional speed. This hydraulic tubing is not over three-eighths of an inch outside diameter and can be curved to meet the necessities of installation without serious limitation as to sweep and without sensibly increasing the flow resistance of the circulating oil and the power required.

In the accompanying drawings I have illustrated certain embodiments of my invention. In these drawings, Figure 1 is a side elevation of a conventional locomotive showing the speed indicating driving mechanism installed; Figure 2 is a front view of the instrument within the cab, showing the operating connections; Figure 3 is a detail of the friction drive wheel showing, in section, the hydraulic pump carried by the wheel, and Figure 4 illustrates a modified form of my invention in which the pump is separately mounted and driven from the friction wheel by means of a short length of flexible shaft.

In these drawings 1 indicates a friction drive wheel pivotally mounted adjacent one of the drivers of the locomotive and making frictional engagement with the tread; 2 is a speed indicating instrument mounted in the locomotive cab; 3 is a hydraulic pump carried by the friction wheel 1; 4 is a constant displacement liquid motor mounted just below the instrument housing; and 5 is the tubing connecting the pump and the motor. It is common practice to combine recording with indicating mechanisms, and the term speed indicator used here is intended to embrace either or both.

As shown best in Figure 3, the friction drive wheel 1 is journaled upon an arm 6 pivoted upon a bracket 7 mounted upon the locomotive frame, and is urged into frictional engagement with its driver, not only by its own weight, but by means of a spring 8. The pump 3, a hydraulic pump of the impeller or rotary vane type, forms, of itself, no part of this invention and need not be described in detail. It is driven as follows: The shaft 9 of the friction wheel 1 is provided with a worm 10 which engages a worm wheel 11 on an extension 12 of the pump shaft 13, so that rotation of the friction wheel 1 drives the shaft 13 and operates the pump. As the friction wheel 1 vibrates through a short arc in normal operation, I provide flexible connections 14 between the tubing 5 and the pump.

In the modified form shown in Figure 4, the pump 3' is mounted independently of the friction wheel and is driven by the latter through a flexible shaft 15, passing through a short conduit having a rigid section 16 and flexible section 17, the latter permitting vibration of the friction wheel.

In both forms of drive each branch of the tubing 5 is provided with an accumulator 18 containing the usual air cushion, the function of these being to absorb sudden pressure surges.

The operation will be clear from the foregoing. The system, including pump, motor and tubing, is filled with a suitable liquid. The speed of the pump is directly proportional to the speed of the friction drive wheel so that the rate of flow of the liquid within the system varies with the speed of the locomotive, and the motor 4, being of the constant displacement type, varies in speed with the rate of flow of liquid through it. Thus the motor 4 is driven at a speed that is directly proportional to that of the pump. These speeds may be synchronized or they may not. In any case the indicator instrument must be properly calibrated. The pump shaft is connected to the mechanism of the instrument and actuates the instrument needle in the usual way. By this means the indicator is operated with precision, and without the use of a long flexible shaft rotating within a long conduit which cannot be curved without imposing a frictional burden on the mechanism. As shown in Figure 1 the tubing of my hydraulic system can be bent around sharp corners, if necessary, without impairing the efficiency of the operation and is thus particularly adapted for use on steam locomotives.

I claim:

A device for driving an instrument for indicating the speed of a moving wheeled vehicle comprising a friction wheel driven by one of the wheels of the vehicle, a hydraulic pump carried by the friction wheel, driving connections between the friction wheel and the pump, a constant displacement liquid motor for operating the speed-responsive mechanism, a conduit connecting the outlet of the pump with the inlet of the motor, a conduit connecting the outlet of the motor with the inlet of the pump, and liquid in said pump, motor and conduits, whereby the pump and motor operate in a closed hydraulic circuit and the speed at which the motor operates is proportional to the speed at which the pump is driven, and consequently to the speed of the vehicle.

FAY D. WELDEN.